(12) United States Patent
Haremaki et al.

(10) Patent No.: US 11,571,777 B2
(45) Date of Patent: Feb. 7, 2023

(54) MACHINING APPARATUS

(71) Applicant: SUGINO MACHINE LIMITED, Uozu (JP)

(72) Inventors: Hiroki Haremaki, Uozu (JP); Yoshiteru Kawamori, Itasca, IL (US); Taiki Matsui, Uozu (JP)

(73) Assignee: SUGINO MACHINE LIMITED, Toyama Prefecture (JP)

( * ) Notice: Subject to any disclaimer, the term of this patent is extended or adjusted under 35 U.S.C. 154(b) by 0 days.

(21) Appl. No.: 17/245,410

(22) Filed: Apr. 30, 2021

(65) Prior Publication Data
US 2021/0387299 A1 Dec. 16, 2021

(30) Foreign Application Priority Data

Jun. 10, 2020 (JP) .............................. JP2020-100624
Jan. 28, 2021 (JP) .............................. JP2021-011905

(51) Int. Cl.
*B23Q 11/08* (2006.01)
(52) U.S. Cl.
CPC ...... *B23Q 11/0833* (2013.01); *B23Q 11/0891* (2013.01); *Y10T 409/30392* (2015.01)
(58) Field of Classification Search
CPC . B23Q 11/08; B23Q 11/0833; B23Q 11/0891; Y10T 409/30392; Y10T 409/401925
USPC ......... 409/134, 254; 160/88, 90, 91; 74/608, 74/609
See application file for complete search history.

(56) References Cited

U.S. PATENT DOCUMENTS

| 4,545,630 A * | 10/1985 | Izumi | G01G 21/28 312/285 |
| 6,364,582 B1 * | 4/2002 | Hoppe | B23Q 11/0891 409/134 |
| 6,499,816 B1 * | 12/2002 | Beadel | B23Q 11/0825 312/305 |

(Continued)

FOREIGN PATENT DOCUMENTS

| CN | 104723164 A * | 6/2015 | ......... B23Q 11/0833 |
| DE | 102015118031 A1 * | 4/2017 | |

(Continued)

OTHER PUBLICATIONS

EPO Machine Translation of JP2007190623A—Fujita, Shuji; "Workpiece Cleaning Device Of Machine Tool"; Aug. 2, 2007.*

*Primary Examiner* — Boyer D Ashley
*Assistant Examiner* — Michael Vitale
(74) *Attorney, Agent, or Firm* — United IP Counselors, LLC

(57) ABSTRACT

The machining apparatus includes: a cover including a side plate, a projecting portion disposed below the side plate, a rectangular shaped front opening, and a semicircular shaped planar opening; a first door body including a first drum disposed in a first side of a mating surface, a first abutting surface connected to the first drum, and a first top plate, and accommodated inside the cover by rotated about a first axis; and a second door body including a second drum disposed in the second side of the mating surface, a second abutting surface abut to the first abutting surface on the mating surface, and a second top plate, and accommodated inside the cover by rotated about a second axis.

20 Claims, 11 Drawing Sheets

(56) References Cited

U.S. PATENT DOCUMENTS

| | | | | |
|---|---|---|---|---|
| 2008/0025015 A1* | 1/2008 | Seitz | ......... | B23Q 17/2404 |
| | | | | 362/89 |
| 2009/0145030 A1* | 6/2009 | Landerer | ......... | B23Q 11/0833 |
| | | | | 49/41 |
| 2009/0324354 A1* | 12/2009 | Hara | ......... | F16P 1/02 |
| | | | | 409/134 |
| 2012/0317884 A1* | 12/2012 | Park | ......... | B23Q 11/0891 |
| | | | | 49/370 |
| 2015/0367472 A1* | 12/2015 | Suzuki | ......... | B23Q 11/0089 |
| | | | | 409/134 |

FOREIGN PATENT DOCUMENTS

| | | | | | |
|---|---|---|---|---|---|
| JP | 2007190623 A | * | 8/2007 | | |
| JP | 2009-214214 A | | 9/2009 | | |
| JP | 4725319 B2 | | 7/2011 | | |
| KR | 2002036088 A | * | 5/2002 | ......... | B23Q 11/0833 |
| KR | 20070066693 A | * | 6/2007 | | |
| KR | 20140095160 A | * | 8/2014 | ......... | B23Q 11/08 |

\* cited by examiner

MACHINING APPARATUS

CROSS-REFERENCE TO RELATED APPLICATIONS

This application claims the benefit of priority to Japanese Patent Application No. 2020-100624, filed on Jun. 10, 2020, and Japanese Patent Application No. 2021-011905, filed on Jan. 28, 2021, the entire contents of which are hereby incorporated by reference.

BACKGROUND

1. Technical Field

The present invention relates to a machining apparatus.

2. Description of the Background

A machining apparatus has a loading opening such as a draw-in door or a glide slide door (for example, Japanese Patent No. 4725319, Japanese Patent Application Publication No. 2009-214214).

BRIEF SUMMARY

An object of the present invention is to provide a machining apparatus having a large opening with respect to the front width.

An aspect of the present invention provides machining apparatus, including:
a cover including
a side plate,
a projecting portion connected to the side plate, the projecting portion disposed below the side plate,
a front opening having a rectangular shape located on the side plate, and
a planar opening having a semicircular shape located above the projecting portion, the planar opening connected to the front opening;
a first door body including
a first drum disposed in a first side with respect to a mating surface,
a first abutting surface connected to the first drum, and
a first top plate connected to the first drum and the first abutting surface,
the first door body configured to be accommodated inside the cover by rotating about a first axis that is offset toward a second side with respect to the mating surface; and
a second door body including
a second drum disposed in the second side with respect to the mating surface,
a second abutting surface connected to the second drum, the second abutting surface configured to abut to the first abutting surface on the mating surface, and
a second top plate connected to the second drum and the second abutting surface,
the second door body configured to be accommodated inside the cover by rotating about a second axis that is offset toward the first side with respect to the mating surface.

The machining apparatus includes a cutting machine for machining a workpiece, a deburring machine, a deburring machine for deburring or cleaning a workpiece by jets, a cleaning apparatus and an air blower. The cutting machine is, for example, a vertical lathe, a vertical machining center, and a horizontal machining center. The cleaning apparatus is, for example, a table rotary cleaning apparatus, a cage rotary cleaning apparatus, and an aiming cleaning apparatus.

The opening is a loading opening or an unloading opening. The planar opening is formed so as to have a slight gap from the door device when the first door body and the second door body are closed. At this time, the front opening is closed from inside of the front opening by the first door body and the second door body.

The workpiece is machined or cleaned above the planar opening inside the cover. The first door body and the second door body have a pivot region above the planar opening inside the cover. When the door is opened, most or all of the first door body and the second door body are accommodated inside the cover.

Preferably, when the door is opened, the table on which the workpiece is placed is exposed to the planar opening in a plan view.

The first door body and the second door body extend below the upper surface of the projecting portion. For example, each of the first drum and the second drum is a quarter cylindrical surface.

The first abutting surface and the second abutting surface are disposed on the radial end surface of the first drum and the second drum, respectively. Preferably, the first abutting surface extends in an L-shape along the first top plate and the first drum. Preferably, the first inner folded back and the third folded back portion also extend in an L-shape along the first top plate and the first drum. Preferably, the second abutting surface extends in an L-shape along the second top plate and the second drum. Preferably, the second inner folded back also extends in an L-shape along the second top plate and the second drum.

Preferably, the first axis, the second axis, the first arm, the second arm, the third arm and the fourth arm are disposed on the back of the side plate when viewed toward the side plate.

When the door packing is disposed, the first abutting surface is abutted against the second abutting surface over the door packing. When the door packing is disposed, the door packing seals between the first abutting surface and the second abutting surface.

The mating surface is perpendicular to the side plate. For example, the mating surface is located at the center of the front opening.

Preferably, a first gap adjusting member is disposed along the other side of the front opening on the back of the side plate toward the front opening. The first gap adjusting member has a contact surface corresponding to the shape of the first drum and the outer folded back. When the first door body is closed, the first gap adjusting member is in close contact with the first drum and the outer folded back. A second gap adjusting member is installed along one side. The second gap adjusting member has a corresponding to the shape of the second door body. The second gap adjusting member has substantially the same structure as the first gap adjusting member.

Preferably, the planar opening is formed so that the gap from the first door body and the second door body becomes constant when the first door body and the second door body are closed. At this time, the gap is formed small enough that the first door body and the second door body does not collide with the projecting portion.

A driving gear, even number of idler gears, and a driven gear mesh in this order. The drive gear and the driven gear has the same number of teeth.

The first packing receiver extends on a plane. The second packing receiver also extends on a plane.

When the first door body and the second door body are closed, the first packing receiver and the second packing receiver may be disposed on one plane. At this time, the first packing receiver and the second packing receiver may crush the opening packing.

The first door and the first pedestal may be integrally formed or may be separate. When the first door body is separate from the first pedestal, and the first door body is fastened to the first pedestal, the position of the first door body and the first pedestal is preferably adjustable.

The second door and the second pedestal may be integrally formed or may be separate. When the second door body is separate from the second pedestal, and the second door body is fastened to the second pedestal, the position of the second door body and the second pedestal is preferably adjustable.

Preferably, a pair of first wheels are disposed above and below the first rail. Preferably, a plurality of first wheels are circumferentially disposed. A multiple pairs of upper and lower first wheels may be arranged in the circumferential direction. A multiple first wheels may be alternately disposed above and below the first rail. For example, two first wheels are arranged above the first rail apart from each other. At the middle portion of the two first wheels arranged above the first rail, a single first wheel may be arranged below the first rail.

Preferably, a pair of second wheels are disposed above and below the second rail. Preferably, a plurality of second wheels are circumferentially disposed. A multiple pairs of upper and lower second wheels may be arranged in the circumferential direction. A multiple second wheels may be alternately disposed above and below the second rail. For example, two second wheels are arranged above the second rail apart from each other. At the middle portion of the two second wheels arranged above the second rail, a single second wheel may be arranged below the second rail.

According to the present invention, a machining apparatus having a large opening with respect to the front width is provided.

DETAILED DESCRIPTION

First Embodiment

Figure 1:
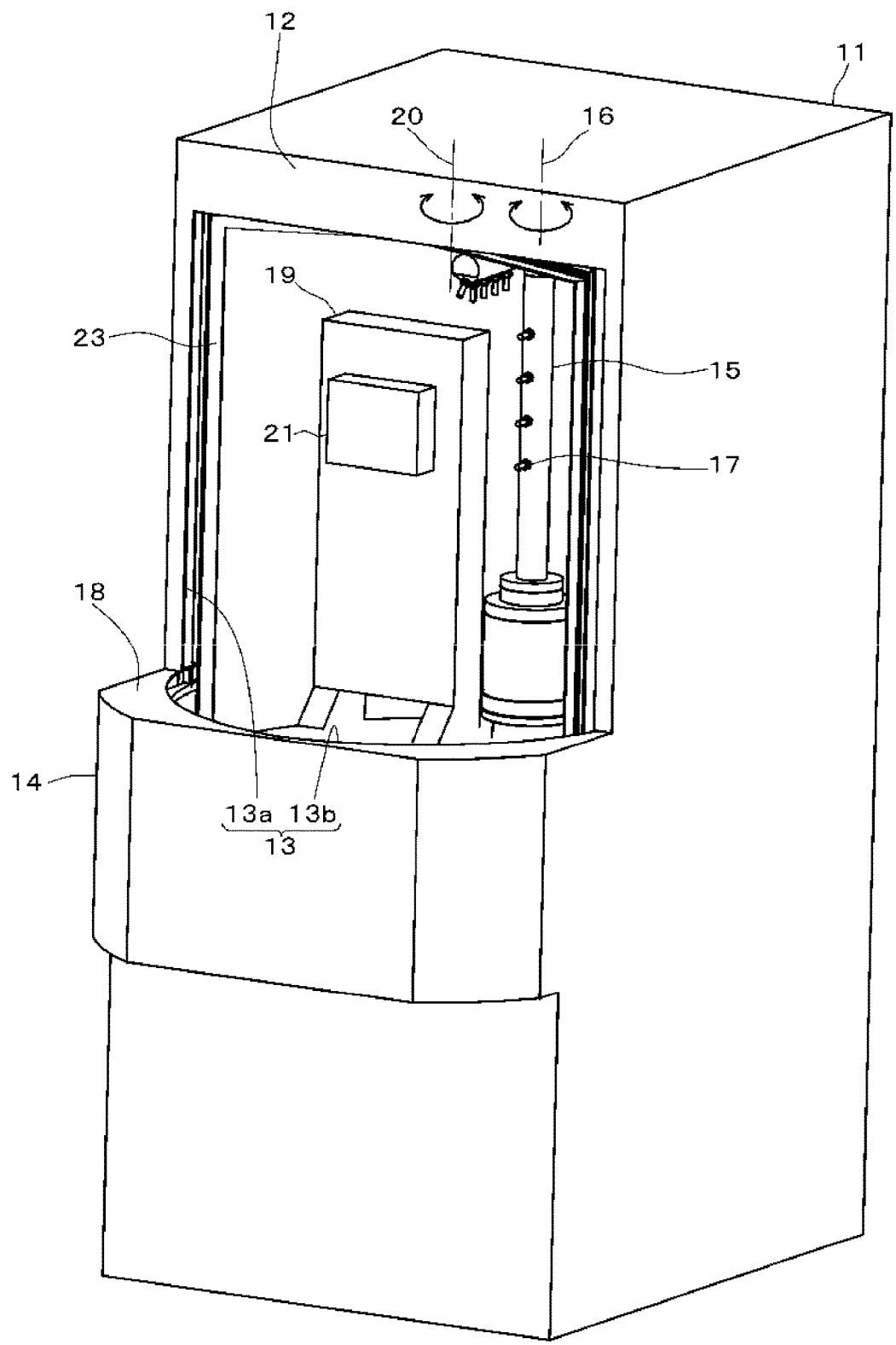
FIG. 1 is a perspective view of a cleaning apparatus according to a first embodiment.

As shown in FIG. 1, a cleaning apparatus (machining apparatus) 10 according to the present embodiment includes a cover 11, a door device 23, a table 19, a nozzle pipe 15, and a nozzle 17. The cover 11 includes a side plate 12, a projecting portion 14, and an opening 13. The side plate 12 is located on a front surface of the cleaning apparatus 10 above the projecting portion 14. The projecting portion 14, which is disposed below the side plate 12, protrudes in a front direction. For convenience, an upper surface of the projecting portion 14 is referred to as a table surface 18.

The opening 13 is arranged over the side plate 12 and the table surface 18. The opening 13 has a front opening 13a and a planar opening 13b. The front opening 13a extends to the almost entire surface of the side plate 12 up to a lower end of the side plate 12. The front opening 13a has a rectangular shape. The planar opening 13b is substantially semicircular. The planar opening 13b is disposed on the table surface 18. The planar opening 13b has the same width as the front opening 13a, and the planar opening 13b is disposed at the same position as the front opening 13a as viewed from the front.

The table 19 is disposed near the center of the planar opening 13b. A workpiece 21 is placed on the table 19. The table 19 is rotatable about a table axis 20 located near the center of the planar opening 13b.

At least one nozzle 17 is installed on the nozzle pipe 15. The nozzle pipe 15, which is L-shaped, swings about a nozzle axis 16. The nozzle 17 is swung in synchronization with the table 19. The nozzle 17 ejects the cleaning fluid toward the workpiece 21.

Figure 2:
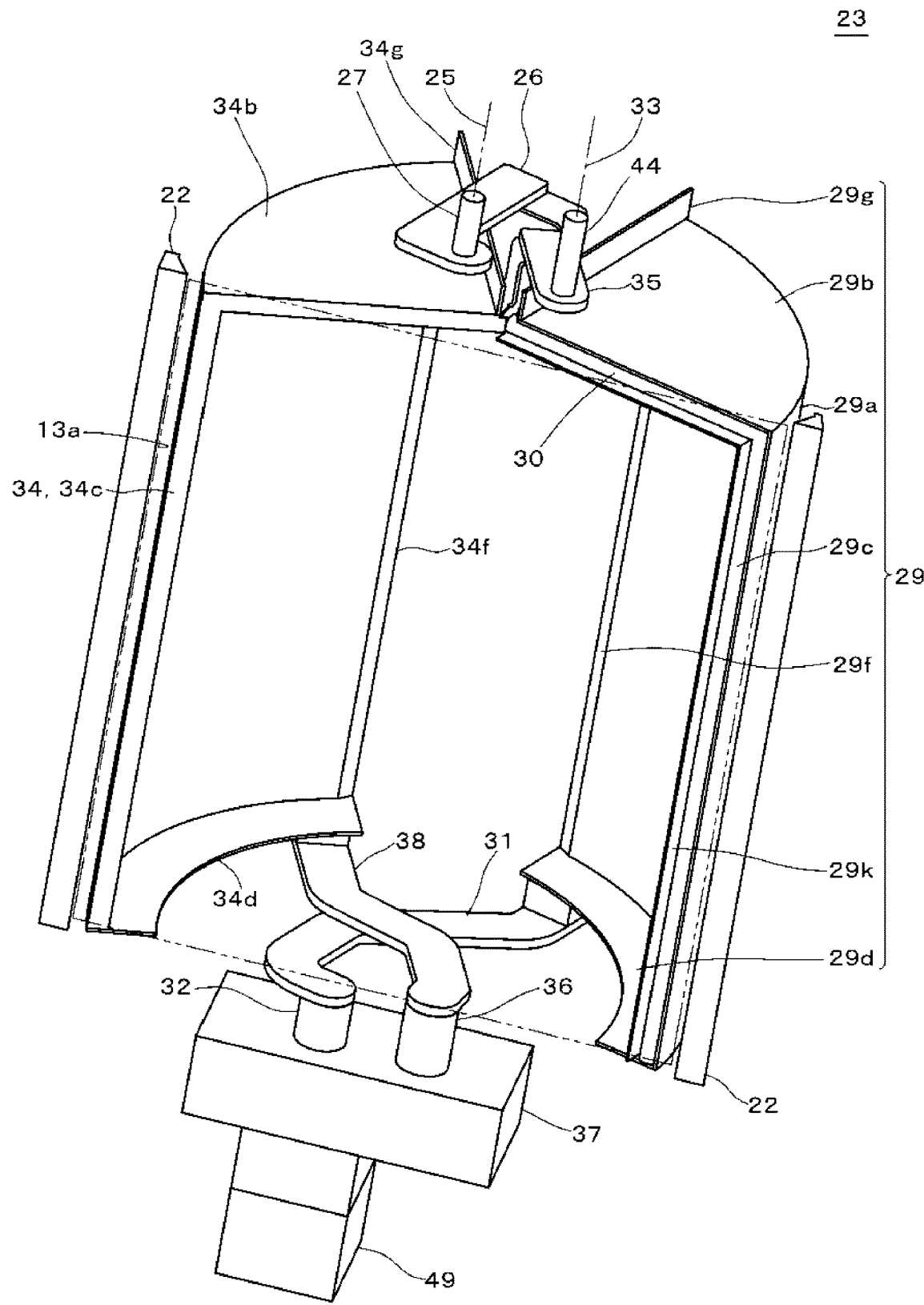
FIG. 2 is a perspective view showing a door device in an open state according to the first embodiment.
Figure 3:
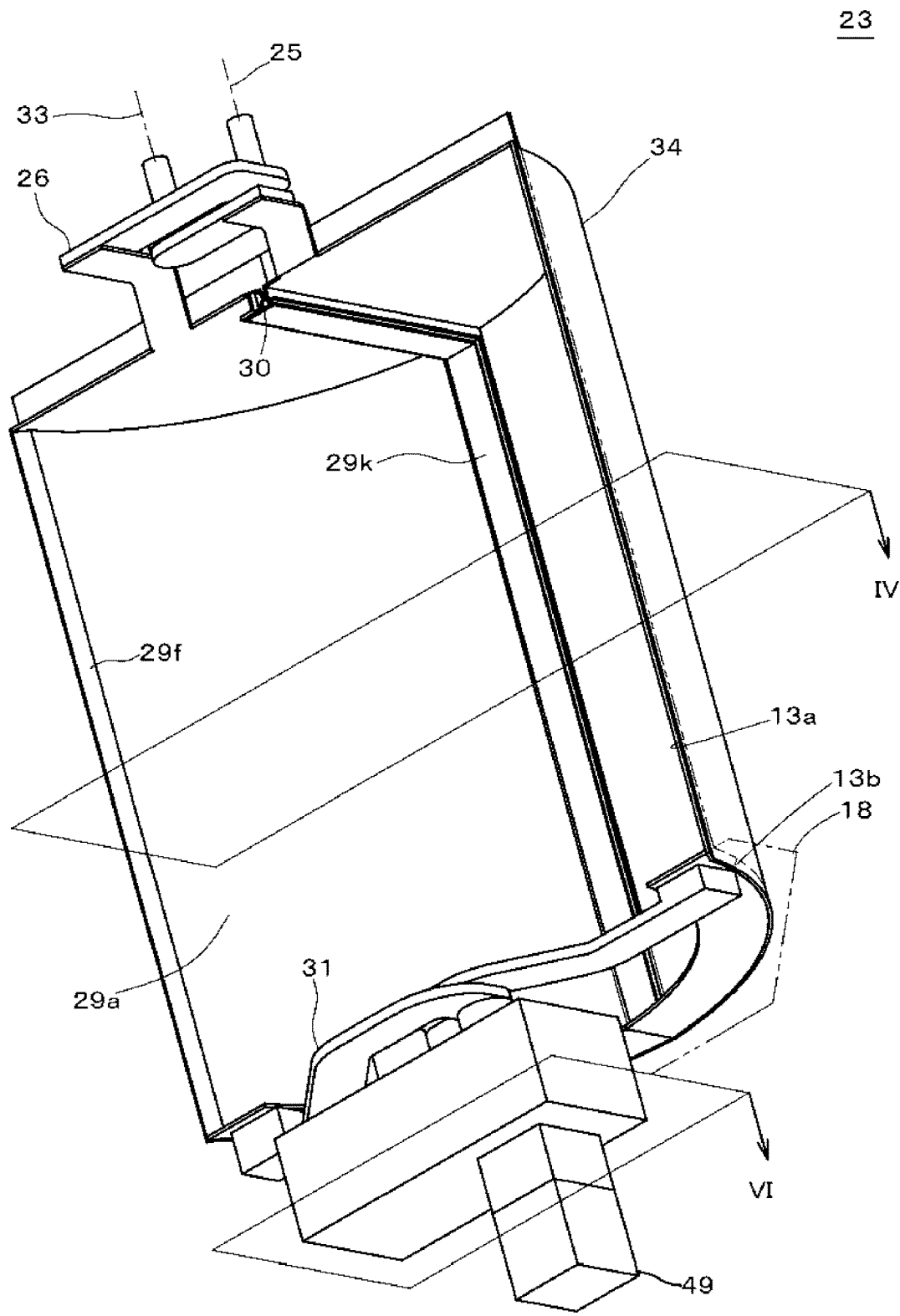
FIG. 3 is a perspective view showing the door device in a closed state according to the first embodiment.

FIG. 2 is a perspective view of the door device 23 as viewed from the front obliquely upward. As shown in FIG. 2, the door device 23 includes a first door body 29, a first arm 31, a second arm 26, a first shaft body 32, a second shaft body 27, a second door body 34, a door packing 30, a gap adjusting member 22, a third arm 38, a fourth arm 35, a third shaft body 36, a fourth shaft body 44, a gear case 37, and a motor 49.

The first door body 29 includes a first drum 29a, a first top plate 29b, a first abutting surface 29c, a first outer folded portion 29f, a bottom plate 29d, and an upper folded back 29g.

The first drum 29a is a plate bent along a cylindrical surface by cutting a vertical cylindrical surface approximately ¼ in a plan view. The first drum 29a extends below the table surface 18. The first top plate 29b, which is a fan-shaped plate, closes the upper portion of the first drum 29a. When the door device 23 is closed, the shape of the first top plate 29b is defined by the first drum 29a, a mating surface 28, and a straight line 29n rearward from the rear surface of the side plate 12 (see FIG. 4). The bottom plate 29d, which is a bottom plate of the first drum 29a, is arc-shaped along the first drum 29a. The first drum 29a, the first top plate 29b, and the bottom plate 29d are joined to form a main portion of the first door body 29.

The first abutting surface 29c is a plane provided along a side opening at the front side of the drum.

Figure 4:
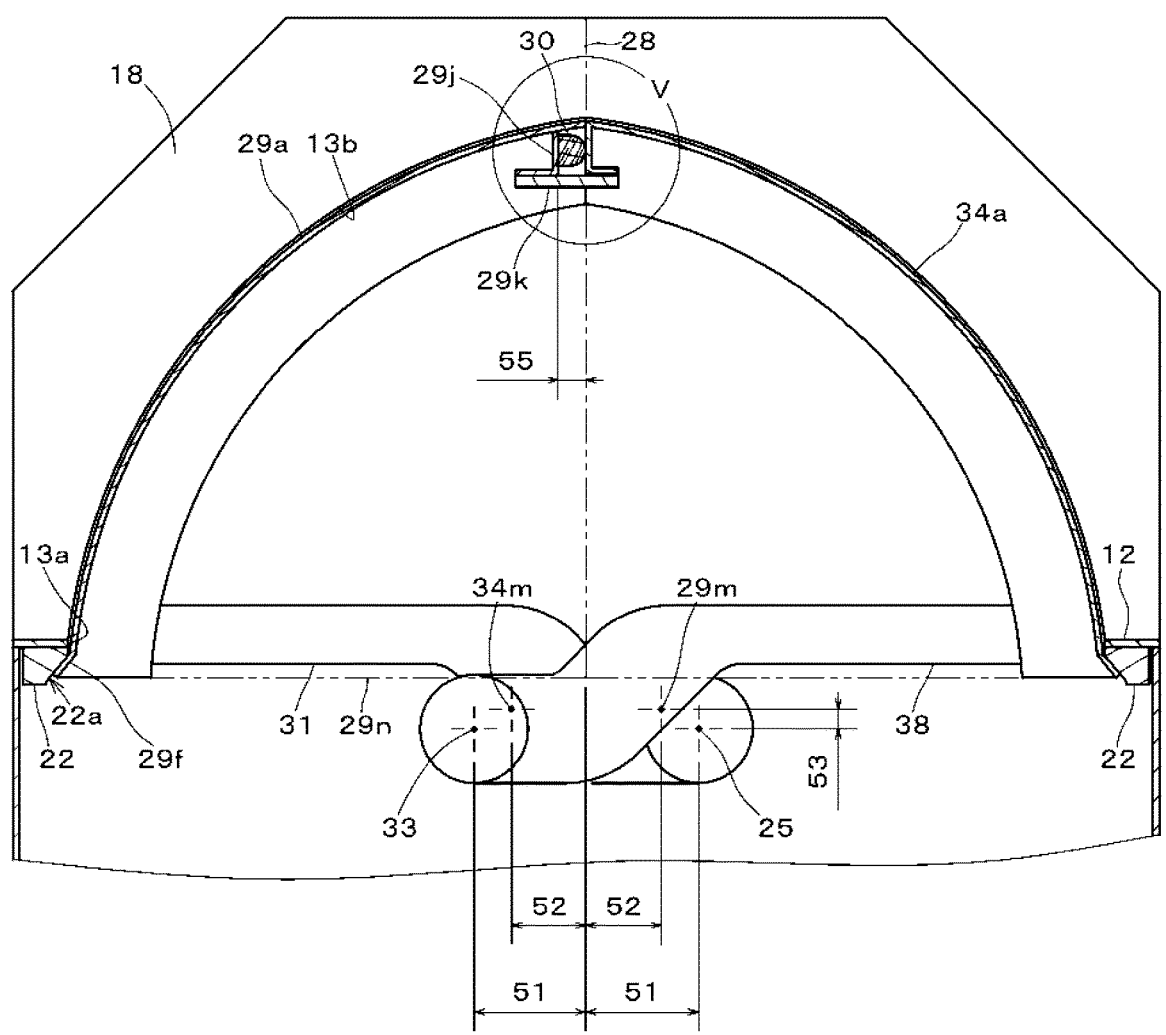
FIG. 4 is a cross-sectional view of IV plane in FIG. 3.

The first outer folded portion 29f, which is disposed at the rear end of the first drum 29a, is a folded back of the first drum 29a. The first outer folded portion 29f extends outwardly 20 degrees to 90 degrees from a tangential direction of the first drum 29a. Preferably, the first top plate 29b and the bottom plate 29d are connected to the first outer folded portion 29f. As shown in FIG. 4, when the first door body 29 is closed, the first outer folded portion 29f is positioned so as to cover the gap between the first drum 29a and the front opening 13a on the back side of the side plate 12.

The upper folded back 29g, which is the opposite end of the first abutting surface 29c of the first top plate 29b, extends upward from the first top plate 29b. The upper folded back 29g extends over the entire radial width of the first top plate 29b. When the door device 23 is closed, the upper folded back 29g faces the side plate 12 with a slight gap at the front opening side inside the side plate 12.

Figure 5:
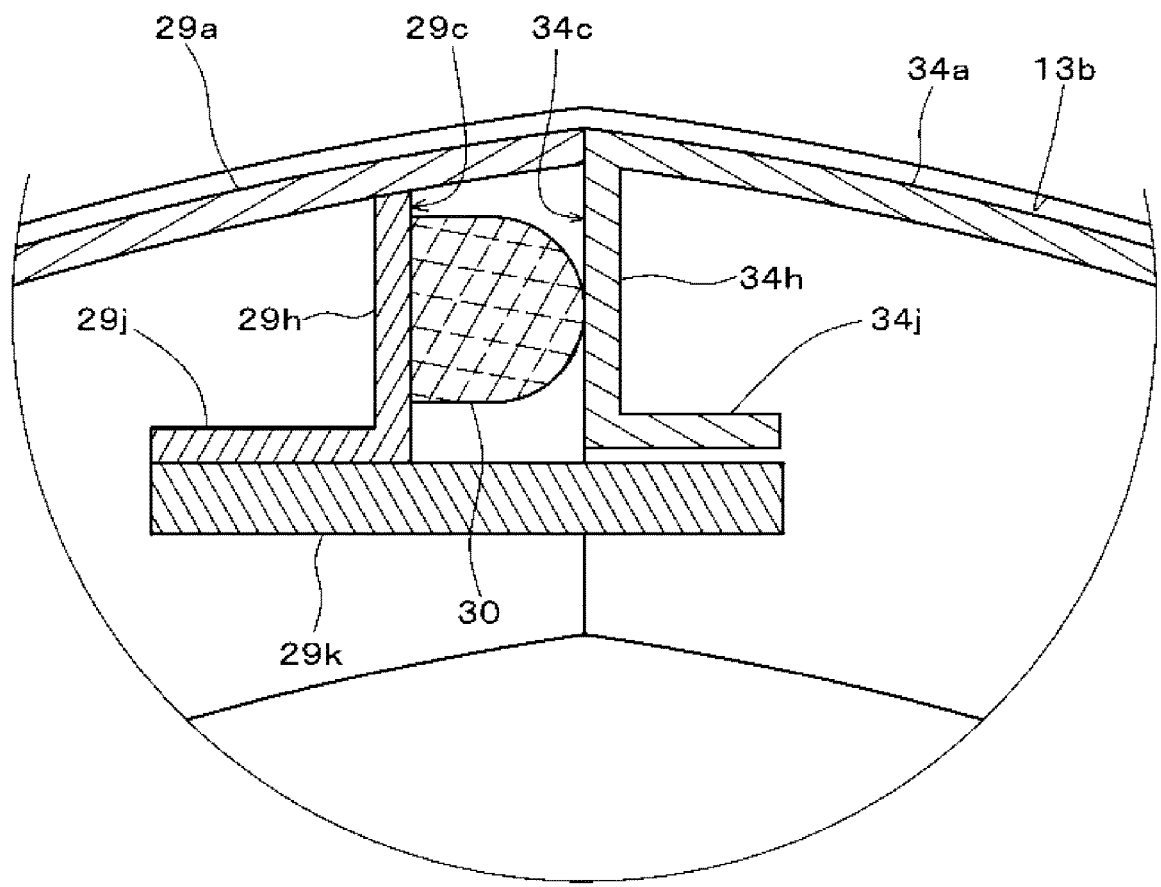
FIG. 5 is an enlarged view of a V part in FIG. 4.

As shown in FIGS. 4 and 5, the first door body 29 includes an inner folded back 29h, a first inner folded back 29j, and a third inner folded back 29k. The inner folded back 29h, which is the first turn, rises substantially perpendicularly from the first drum 29a. When the door device 23 is open, the plane of the front end side of the inner folded back 29h is the first abutting surface 29c. The first inner folded back 29j, which is the second turn, is folded back perpendicularly from a distal end of the inner folded back 29h toward the center of the first drum 29a. The first inner folded back 29j extends from the distal end of the inner folded back 29h as a starting point, and the first inner folded back 29j extends away from the first abutting surface 29c.

Furthermore, the third inner folded back 29k, which is the third turn, is arranged along the first inner folded back 29j. The third inner folded back 29k protrudes beyond the mating surface 28. The first inner folded back 29j and the third inner folded back 29k extend perpendicularly to the mating surface 28. When the door device 23 is closed, the third inner folded back 29k enters the radially inner side of an inner folded backs 34h, 34j (described later) of the second door body 34.

The inner folded backs 29h, 29j, 29k are arranged continuously along the inside of the upper and lateral side of the front end portion of the first door body 29.

For example, the door packing 30 has a semicircular cross section. The door packing 30 is disposed over the entire length of the first abutting surface 29c. The first abutting surface 29c including the door packing 30 is disposed away from the mating surface 28 by a crush allowance 55 of the door packing 30.

As shown in FIG. 4, the gap adjusting member 22 has a contact surface 22a. The gap adjusting member 22, is arranged on the back of the side plate 12 along the side of the front opening 13a. The contact surface 22a, has a corresponding shape of the first drum 29a and the first outer folded portion 29f when the first door body 29 is closed. The gap adjusting member 22 has a trapezoidal cross-section as a whole. When the door device 23 is closed, the contact surface 22a is in contact with the first drum 29a and the first outer folded portion 29f, and the gap adjusting member 22 occupies the gap between the first door body 29 and the front opening 13a.

The gap adjusting member 22 is also disposed on the second door body 34 side.

As shown in FIGS. 2 to 5, the second door body 34 has substantially the same structure as the first door body 29 except that the second door body 34 does not include the third folded back 29k of the third turn and the door packing 30 is not disposed. The second door body 34 has a substantially symmetrical structure as the first door body 29 with respect to the mating surface 28. The second door body 34 includes a second drum 34a, a second top plate 34b, a second bottom plate 34d, a second outer folded back 34f, a second abutting surface 34c, an inner folded back 34h, a second inner folded back 34j, and an upper folded back 34g.

The inner folded back 34h extends radially inward from the front edge of the second drum 34a. The outside of the inner folded back 34h, which is located at front end when the second door body 34 is open, is the second abutting surface 34c. When the second door body 34 is closed, the second abutting surface 34c is aligned with the mating surface 28. The second inner folded back 34j extends from the radially inner end of the inner folded back 34h. When the second door body 34 and the first door body 29 is closed, the second inner folded back 34j faces the third inner folded back 29k with a slight gap.

As shown in FIG. 2, the first shaft body 32, which is supported via a bearing 46 (see FIG. 7) to the gear case 37, is disposed below the second door body 34. The first shaft body 32 is rotatable about the first axis 25. The first arm 31 connects the first shaft body 32 and the rear end portion of the bottom plate 29d.

The second shaft body 27 is disposed above the second door body 34. The second shaft body 27 is supported on the cover 11 by a bearing (not shown). The second shaft body 27 is rotatable about the first axis 25. The second arm 26 connects the second shaft body 27 and the rear end portion of the first top plate 29b.

As shown in FIG. 4, when the first door body 29 is closed, the first arm 31 is positioned behind the first door body 29.

The first axis 25 is offset by a distance 51 from the mating surface 28. A center axis 29m of the first drum 29a is offset by a distance 52 from the mating surface 28. The distance 52 is less than the distance 51. Further, the center axis 29m is offset by a distance 53 from the first axis 25 toward front in a front-rear direction.

As the center axis 29m is offset frontward from the first axis 25 toward the mating surface 28, the gap between the first drum 29a and the front opening 13a, and the gap between the first drum 29a and the planar opening 13b become small when the first door body 29 is rotated to be closed. When the first door body 29 is completely closed, the gap between the first drum 29a and the front opening 13a is minimized. The second door body 34 is substantially the same as the first door body 29.

The structures of the third shaft body 36, the fourth shaft body 44, the third arm 38, and the fourth arm 35 are substantially the same as those of the first shaft body 32, the second shaft body 27, the first arm 31, and the second arm 26, respectively. The third shaft body 36 is supported by the gear case 37 via the bearing 40.

Figure 6:
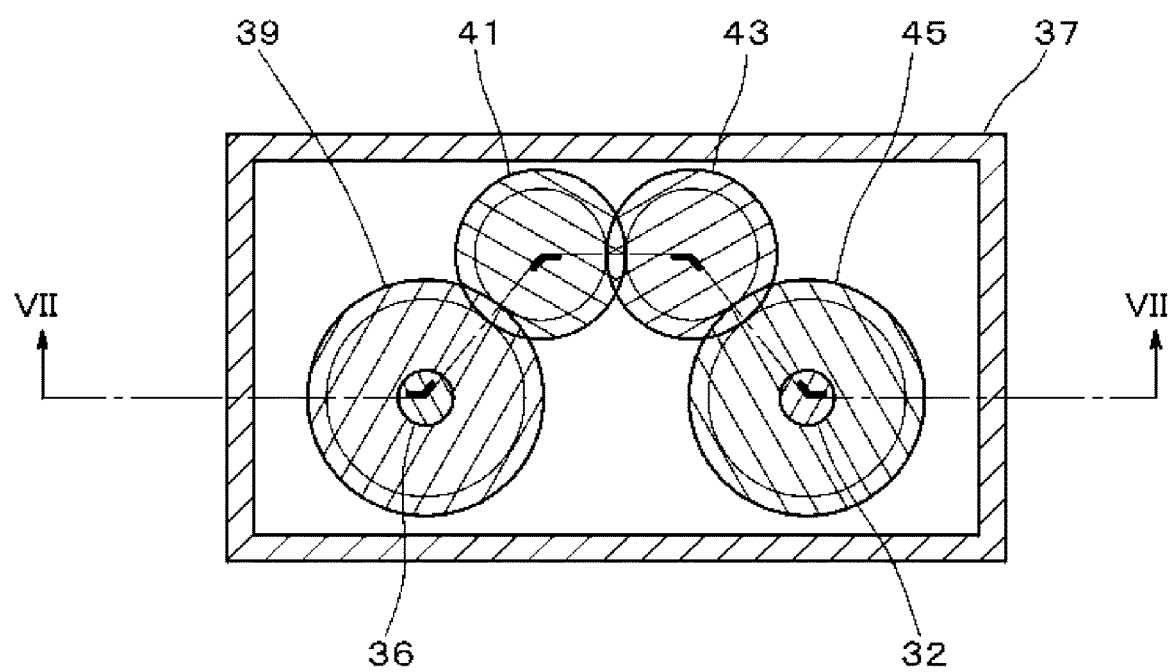
FIG. 6 is a cross-sectional view of VI plane in FIG. 3.
Figure 7:
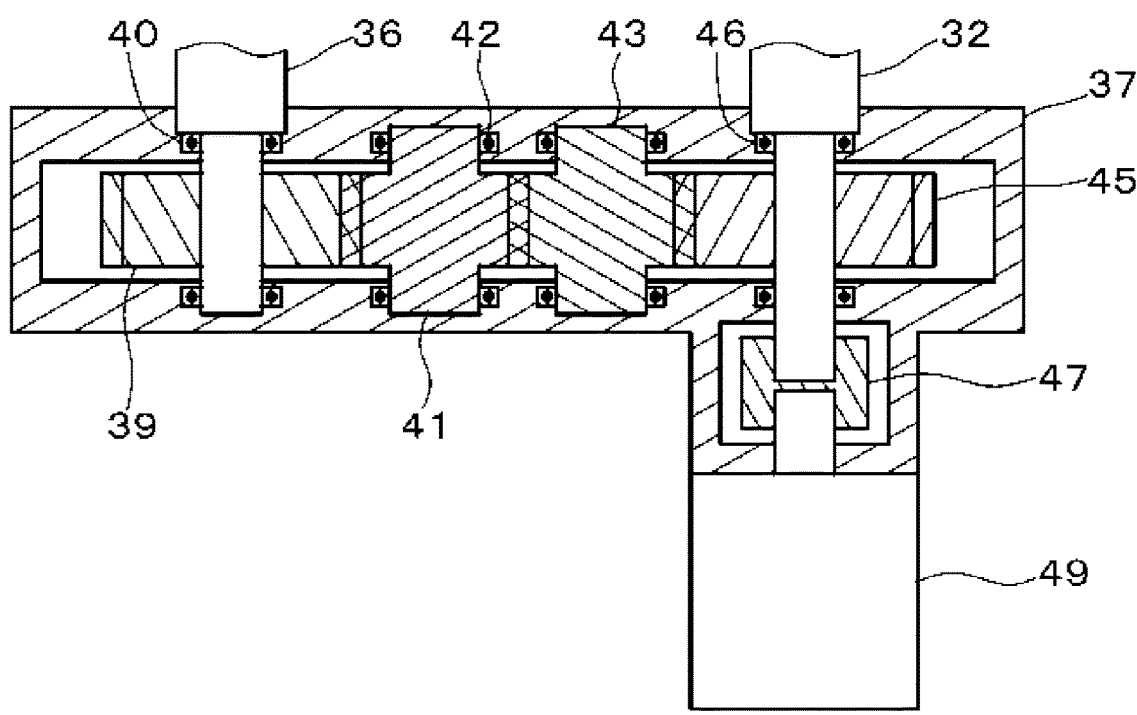
FIG. 7 is a cross-sectional view along line VII-VII in FIG. 6.

As shown in FIGS. 6 and 7, the cleaning apparatus 10 includes a coupling 47, a driving gear 45, two idler gears 41, 43, and a driven gear 39.

The gear case 37 has a hollow rectangular parallelepiped shape. The gear case 37 accommodates the coupling 47, the driving gear 45, the two idler gears 41, 43, and the driven gear 39.

The motor 49 is disposed on the gear case 37. The motor 49 is, for example, a servo motor, and a stepping motor. The motor 49 may be a motor with a brake.

The motor 49 has an output shaft coupled to the first shaft body 32 by the coupling 47.

The driving gear 45 is disposed on the first shaft body 32. The idler gears 41, 43 are supported on the gear case 37 by the bearing 42. The driven gear 39 is disposed on the third shaft body 36. The driven gear 39 has the same number of teeth as the driving gear 45. The driving gear 45, the idler gear 43, the idler gear 41, and the driven gear 39 mesh in this order. The driven gear 39 rotates in a reverse direction to the driving gear 45 at the same rotation speed and the rotation amount as the driving gear 45.

When the cleaning fluid splashes inside the cover 11, the cleaning fluid collides with the inner folded backs 29j, 29h, and 29k to suppress directly colliding with the joint portion between the first door body 29 and the second door body 34. The third inner folded back 29k suppresses the cleaning fluid from colliding with the door packing 30. The first inner folded back 29j causes the cleaning fluid to fly along the first drum 29a when the cleaning fluid is bounced by colliding with the inner folded back 29h. As the third inner folded back 29k and the second inner folded back 34j are disposed close to each other, the cleaning fluid is prevented from colliding with the first abutting surface 29c, the second abutting surface 34c, and the door packing 30.

When the cleaning fluid splashes inside the cover 11, the cleaning fluid is bounced inside the cover 11 by colliding with the upper folded back 29g. As the upper folded back 29g is disposed close to the side plate 12, the cleaning fluid is prevented from splashing out of the cover 11 through the gap between the first top plate 29b and the opening 13.

When the cleaning fluid splashes inside the cover 11, the cleaning fluid is bounced inside the cover 11 by colliding with the first outer folded portion 29f. As the first outer folded portion 29f is disposed close to the side plate 12, the cleaning fluid is prevented from splashing out of the cover 11 through the gap between the drums 29a, 34a and the opening 13.

As the gap adjusting member 22 is disposed, the gap between the door bodies 29, 34 and the front opening 13a is occupied when the door device 23 is closed. The gap adjusting member 22 prevents the cleaning fluid from splashing out of the door bodies 29, 34 and the front opening 13a.

As the door bodies 29, 34 include the bottom plates 29d, 34d, respectively, the cleaning liquid collides with the bottom plates 29d, 34d, and does not scatter directly above the outside of the drums 29a, 34a. Furthermore, the drums 29a, 34a extend below the table surface 18, and the gap between the planar opening 13b and the drums 29a, 34a is small. This prevents the cleaning liquid from splashing out of the gap between the doors 29, 34 and the table surface 18.

When the door device 23 is open, most or all of the first door body 29 and the second door body 34 are accommodated inside the cover 11. When the door device 23 is closed, the cover 11, the first door body 29, the second door body 34, and the projecting portion 14 form a closed space integrally. The cleaning apparatus 10 constitutes a cleaning chamber defined by the closed space formed by closing the door device 23. Then, when the door device 23 is open, the front side portion of the cleaning chamber is exposed at the front of the side plate 12 above the projecting portion 14.

When the door device 23 is open, the upper and the front of the table 19 and the workpiece 21 are greatly exposed. Therefore, the cleaning apparatus 10 is easily combined with an overhead traveling robot, a floor traveling robot, or a gantry loader.

The door device 23 is a double-open door. The two door bodies 29, 34 open by the same amount, thus reducing the opening and closing time.

The door device 23 sufficiently closes the opening 13, thus the door device 23 suppress the noise generated in the processing and cleaning of the workpiece.

Second Embodiment

Figure 8:
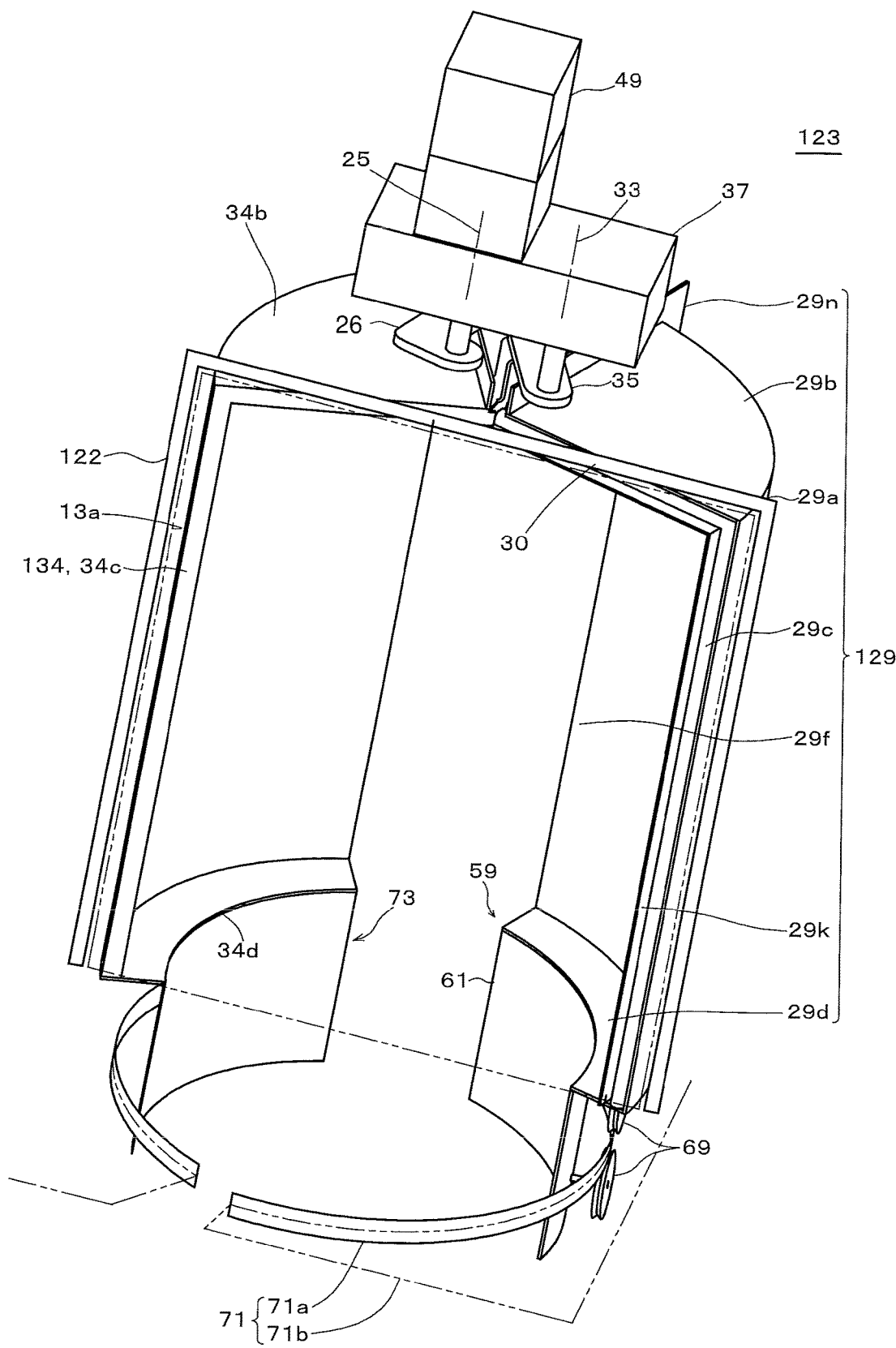
FIG. 8 is a perspective view showing the door device in an open state according to a second embodiment.
Figure 9:
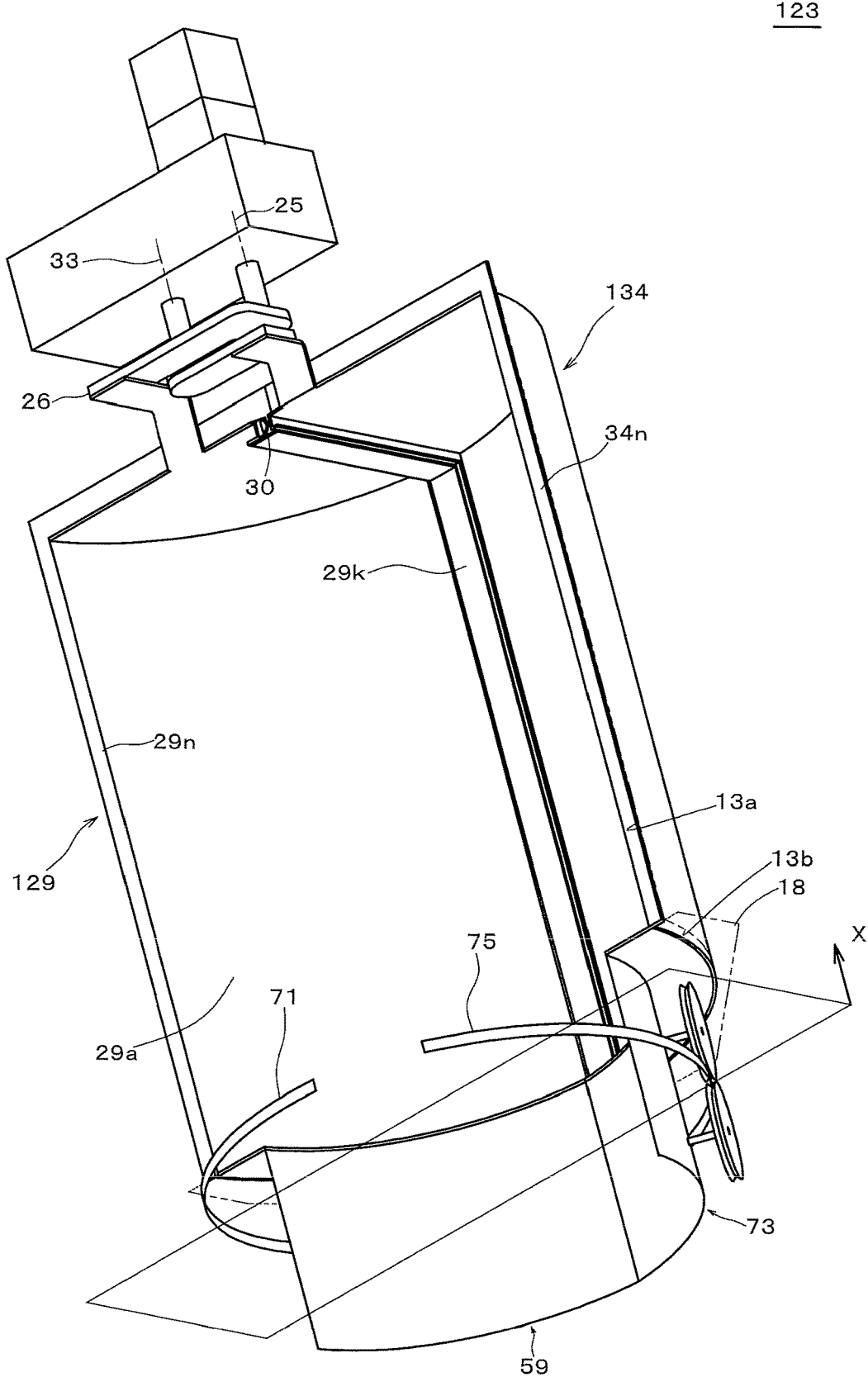
FIG. 9 is a perspective view showing the door device in a closed state according to the second embodiment.

As shown in FIGS. 8 and 9, the door device 123 according to the present embodiment includes a first door body 129, a second door body 134, a first rail 71, a second rail 75, a first pedestal 59, and a second pedestal 73. The door device 123 may include an opening packing 122. The door device 123 according to the present embodiment does not include the first shaft body 32, the third shaft body 36, the first arm 31, the third arm 38, and the gap adjusting member 22 of the first embodiment. The door device 123 includes a gear case 37 and a motor 49. The gear case 37 and the motor 49 are disposed on top of the door device 123.

The first door body 129 may include a packing receiver 29n. The packing receiver 29n is disposed at the rear end of the first door body 129. The packing receiver 29n, which is an L-shaped flat plate, extends outward of the first drum 29a and the first top plate 29b.

The second door body 134 includes a packing receiver 34n. The packing receiver 34n is substantially the same configuration as the packing receiver 29n.

When the first door body 129 and the second door body 134 are closed, the packing receiver 29n and the packing receiver 34n constitute the same plane.

The opening packing 122 is arranged in an inverted U-shape along the outside of the front opening 13a so as to surround the lateral side and upper side of the front opening 13a. The opening packing 122 has a semicircular cross-section such as rearward protrusion or the like. The opening packing 122 is made of, for example, rubber or a rubber sponge. The opening packing 122 may have a hollow structure. When the first door body 129 and the second door body 134 is closed, the packing receiver 29n and the packing receiver 34n are in contact with the opening packing 122. The packing receiver 29n and the packing receiver 34n may crush the opening packing 122. Thus, the opening packing 122 seals between the first door body 129 and the front opening 13a, and between the second door body 134 and the front opening 13a.

The first rail 71 includes a first rail 71a, and a first rail base 71b. The first rail 71 is disposed below the front opening 13a. The rail 71a, which has a longitudinally long rectangular cross-section, extends along a cylindrical surface about the first axis 25. The first rail 71a has a center angle of, for example, 130 degrees to 170 degrees. The first rail base 71b, which is a flat plate extending horizontally, connects the first rail 71a and the projecting portion 14. The first rail base 71b supports the first rail 71a.

The second rail 75 is symmetrical to the first rail 71 with respect to the mating surface 28. The second rail 75 includes a second rail 75a. The second rail 75a extends on a cylindrical surface around the second axis 33.

The first pedestal 59 includes a frame 61, a wheel base 63, a bearing 65, and a wheel 69. The first pedestal 59 may be separated from the first door body 129 to be fastened to the first door body 129. The first pedestal 59 is disposed below the first door body 129.

The frame 61 is, for example, a quarter cylinder. The frame 61 may have a polygonal shape. The frame 61 may be integral with or separated from the first door body 129.

The wheel base 63 includes a flange 63b and a shaft 63a. The flange 63b is fastened to the frame 61. The shaft 63a is integrally formed with the flange 63b. The shaft 63a is a stepped shaft. A bearing 65 is installed on the shaft 63a.

Figure 10:
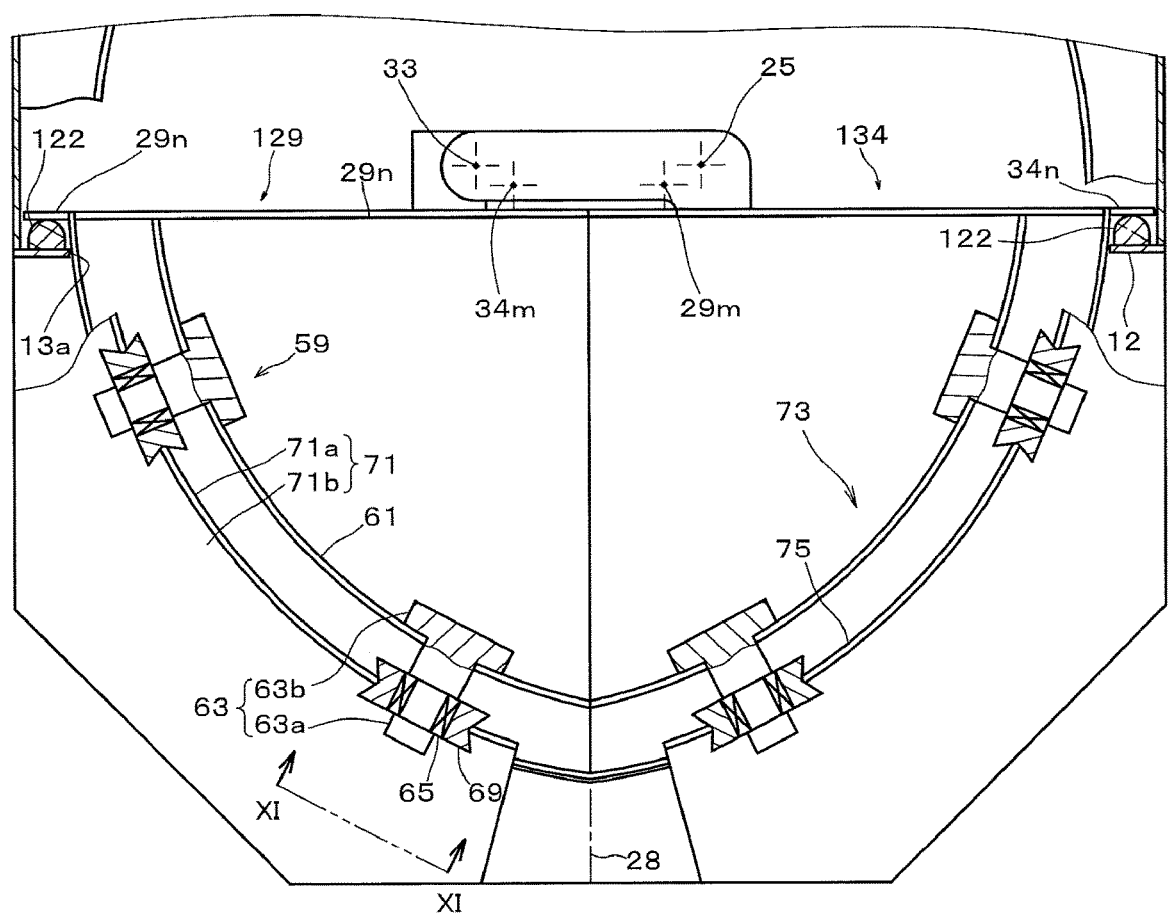
FIG. 10 is a cross-sectional view of X plane in FIG. 9.
Figure 11:
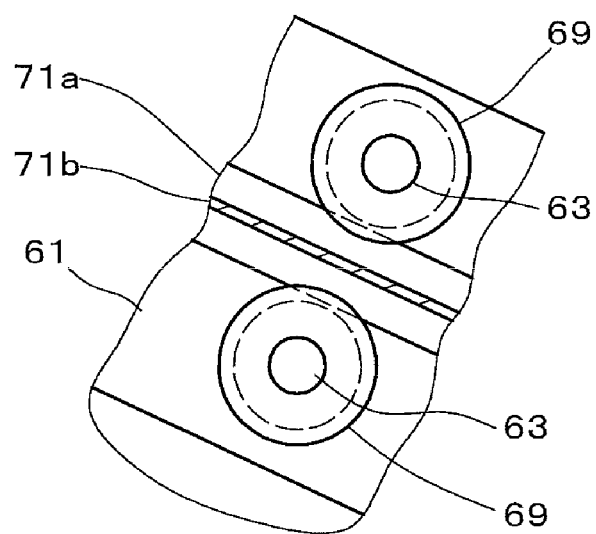
FIG. 11 is a cross-sectional view of line XI-XI in FIG. 10.

As shown in FIGS. 10 and 11, the wheel 69 has a shape in which the truncated cone is arranged to face each other. In other words, the wheel 69 has a groove of V-shaped cross section along its circumference. The wheel 69 is supported on the shaft 63a by bearings 65.

A pair of wheel bases 63, a pair of the bearings 65, and a pair of the wheels 69 are disposed on the upper and lower of the first rail 71 so as the first rail 71a is sandwiched. The V-shaped grooves of the upper and lower wheels 69, respectively, are in contact with the upper and lower ends of the first rail 71a to roll on the first rail 71a. For example, two pairs of the wheels 69 are circumferentially arranged.

The second pedestal 73 is symmetrical to the first pedestal 59 with respect to the mating surface 28.

According to the present embodiment, the first pedestal 59, which is integral with the first door body 129, stably moves on the first rail 71. The second pedestal 73, which is integral with the second door body 134, moves on the second rail 75. Thus, the first door body 129 and the second door body 134 easily keep a stable posture.

When the first door body 129 and the second door body 134 are closed, the packing receiver 29n and the packing receiver 34n forms a single plane to crush the opening packing 122. The packing 122 is elastically deformed to seal the gap between the first door body 129, the second door body 134 and the front opening 13a. Thus, the cleaning liquid or noise is less likely to leak to the outside from the gap between the first door body 129 and the front opening 13a, and, the gap between the second door body 134 and the front opening 13a.

It should be noted that the present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

10 Cleaning apparatus (Machining apparatus)
11 Cover
12 Side plate
13 Opening
25 First axis
28 Mating surface
29 First door body
33 Second axis
34 Second door body

What is claimed is:

1. A machining apparatus, comprising:
a cover including a front face, the cover further including
a side plate located at the front face of the cover,
a projected body connected to the side plate, the projected body disposed below the side plate,
a front opening having a rectangular shape and located at the front face of the cover and below the side plate, and
a planar opening having a semicircular shape located above the projected body, the planar opening connected to the front opening;
a mating surface, which is located, with respect to a first horizontal direction, at a center of the front opening between a first side of the front opening and a second side of the front opening;
a first door body including
a first drum disposed in the first side of the front opening,
a first abutting surface connected to the first drum, and
a first top plate connected to the first drum and the first abutting surface,
the first door body configured to be accommodated inside the cover by rotating about a first axis, the first axis offset from the second side of the front opening such that a first virtual straight line that extends from the first axis in a second horizontal direction intersects the second side of the front opening, the first and the second horizontal directions extending perpendicular to one another; and
a second door body including
a second drum disposed in the second side of the front opening,
a second abutting surface connected to the second drum, the second abutting surface configured to abut the first abutting surface on the mating surface, and
a second top plate connected to the second drum and the second abutting surface,
the second door body configured to be accommodated inside the cover by rotating about a second axis, the second axis offset from the first side of the front opening such that a second virtual straight line that extends from the second axis in the second horizontal direction intersects the first side of the front opening.

2. The machining apparatus according to claim 1, wherein when the first door body and the second door body are closed,
a center axis of the first drum is positioned between the first axis and the mating surface, and
a center axis of the second drum is positioned between the second axis and the mating surface.

3. The machining apparatus according to claim 2, wherein a first offset distance between the first axis and the mating surface is equal to a second offset distance between the second axis and the mating surface.

4. The machining apparatus according to claim 2, wherein the first door body includes a first folded back disposed on a first end portion of the first abutting surface, the first folded back extending perpendicularly from the first abutting surface away from the mating surface, and
the second door body includes a second folded back disposed on a first end portion of the second abutting surface, the second folded back extending perpendicularly from the second abutting surface away from the mating surface.

5. The machining apparatus according to claim 2, further comprising:
a third folded back disposed on either the first abutting surface or the second abutting surface, the third folded back configured to enter the other of the first abutting surface or the second abutting surface when the first door body and the second door body are closed.

6. The machining apparatus according to claim 1, wherein a first offset distance between the first axis and the mating surface is equal to a second offset distance between the second axis and the mating surface.

7. The machining apparatus according to claim 6, wherein the first door body includes a first folded back disposed on a first end portion of the first abutting surface, the first folded back extending perpendicularly from the first abutting surface away from the mating surface, and
the second door body includes a second folded back disposed on a first end portion of the second abutting surface, the second folded back extending perpendicularly from the second abutting surface away from the mating surface.

8. The machining apparatus according to claim 6, further comprising:
a third folded back disposed on either the first abutting surface or the second abutting surface, the third folded back configured to enter the other of the first abutting surface or the second abutting surface when the first door body and the second door body are closed.

9. The machining apparatus according to claim 1, wherein the first door body includes a first folded back disposed on a first end portion of the first abutting surface, the first folded back extending perpendicularly from the first abutting surface away from the mating surface, and the second door body includes a second folded back disposed on a first end portion of the second abutting surface, the second folded back extending perpendicularly from the second abutting surface away from the mating surface.

10. The machining apparatus according to claim 1, further comprising:
a third folded back disposed on either the first abutting surface or the second abutting surface, the third folded back configured to enter the other of the first abutting surface or the second abutting surface when the first door body and the second door body are closed.

11. The machining apparatus according to claim 1, further comprising:
a first arm disposed at a first end of the first axis, the first arm connected to the first door body to be supported in a rotatable manner about the first axis;
a second arm disposed at a second end of the first axis, the second arm connected to the first door body to be supported in a rotatable manner about the first axis;
a third arm disposed at a first end of the second axis, the third arm connected to the second door body to be supported in a rotatable manner about the second axis; and
a fourth arm disposed at a second end of the second axis, the fourth arm connected to the second door body to be supported in a rotatable manner about the second axis.

12. The machining apparatus according to claim 11, further comprising:
a motor disposed at the first end portion of the first axis and connected to the first arm;
a driving gear connected to the first arm, the driving gear having a center at the first axis; and
a driven gear connected to the third arm, the driving gear having a center at the second axis, and the driven gear configured to rotate in a reverse direction to the driving gear at a same rotation speed.

13. The machining apparatus according to claim 12, further comprising:
an even number of idler gears disposed between the driving gear and the driven gear.

14. The machining apparatus according to claim 1, further comprising:
a door packing disposed on either the first abutting surface or the second abutting surface.

15. The machining apparatus according to claim 1, wherein
the first drum includes a first outer folded portion disposed outside of a cylindrical surface, the first outer folded portion located at an end face opposite to the first abutting surface, and
the second drum includes a second outer folded portion disposed outside of a cylindrical surface, the second outer folded portion located at an end face opposite to the second abutting surface.

16. The machining apparatus according to claim 1, wherein
the first door body includes a first upper folded back connected to the first top plate at an end face opposite to the first abutting surface, the first upper folded back extending upward from the first top plate, and
the second door body includes a second upper folded back connected to the second top plate at an end face opposite to the second abutting surface, the second upper folded back extending upward from the second top plate.

17. The machining apparatus according to claim 1, further comprising:
a first rail disposed along an arc having a center at the first axis below the front opening;
a second rail disposed along an arc having a center at the second axis below the front opening;
a first pedestal including a first wheel to roll on the first rail, the first pedestal configured to move along the first rail;
a second pedestal including a second wheel to roll on the second rail, the second pedestal configured to move along the second rail;
a second arm disposed at a first end of the first axis, the second arm connected to the first door body to be supported in a rotatable manner about the first axis; and
a fourth arm disposed at a first end of the second axis, the fourth arm connected to the second door body to be supported in a rotatable manner about the second axis;
wherein the first door body is disposed above the first pedestal, and moves integrally with the first pedestal, and
the second door body is disposed above the second pedestal, and moves integrally with the second pedestal.

18. The machining apparatus according to claim 17, further comprising:
a motor disposed on the first end of the first axis, the motor connected to the second arm;
a driving gear connected to the second arm, the driving gear having a center at the first axis; and
a driven gear connected to the fourth arm, the driving gear having a center at the second axis, and the driven gear configured to rotate in a reverse direction to the driving gear at a same rotation speed.

19. The machining apparatus according to claim 18, further comprising:
an even number of idler gears disposed between the driving gear and the driven gear.

20. The machining apparatus according to claim 17, further comprising:
an opening packing disposed along the front opening to surround the front opening;
wherein the first door body includes a first packing receiver disposed outside the first drum and the first top plate at an end face opposite to the first abutting surface,
the second door body includes a second packing receiver disposed outside the second drum and the second top plate at an end face opposite to the second abutting surface, and
the first packing receiver is in contact with the opening packing and the second packing receiver is in contact with the opening packing when the first door body and the second door body are closed.

* * * * *